(12) United States Patent
Lechnick et al.

(10) Patent No.: US 7,789,945 B2
(45) Date of Patent: Sep. 7, 2010

(54) MAINTAINING LOW CARBON MONOXIDE LEVELS IN PRODUCT CARBON DIOXIDE

(75) Inventors: William J. Lechnick, Glen Ellyn, IL (US); Leonid Bresler, Northbrook, IL (US); Lamar A. Davis, West Dundee, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/566,822

(22) Filed: Sep. 25, 2009

(65) Prior Publication Data
US 2010/0132553 A1 Jun. 3, 2010

(51) Int. Cl.
*B01D 47/00* (2006.01)

(52) U.S. Cl. .............................. 95/236; 95/149; 95/156; 95/187; 96/243; 423/226; 423/228; 423/229

(58) Field of Classification Search .................... 95/149, 95/156, 187, 236; 96/243; 423/226, 228, 423/229
See application file for complete search history.

(56) References Cited

U.S. PATENT DOCUMENTS

| | | | | |
|---|---|---|---|---|
| 3,877,893 A | * | 4/1975 | Sweny et al. .................. | 95/162 |
| 4,052,176 A | * | 10/1977 | Child et al. .................... | 95/161 |
| 4,524,581 A | | 6/1985 | Cascone et al. | |
| 4,552,572 A | * | 11/1985 | Galstaun ...................... | 95/161 |
| 4,568,364 A | * | 2/1986 | Galstaun et al. ............... | 95/176 |
| 4,840,648 A | * | 6/1989 | Grunewald et al. ........... | 95/163 |
| 4,957,515 A | * | 9/1990 | Hegarty ....................... | 95/162 |
| 5,152,975 A | | 10/1992 | Fong et al. | |
| 5,240,476 A | * | 8/1993 | Hegarty ....................... | 95/161 |
| 6,090,356 A | | 7/2000 | Jahnke et al. | |
| 6,521,143 B1 | | 2/2003 | Genkin et al. | |
| 6,596,780 B2 | | 7/2003 | Jahnke et al. | |
| 7,503,947 B2 | | 3/2009 | Barnicki | |
| 2006/0236697 A1 | | 10/2006 | Rao et al. | |
| 2007/0129450 A1 | | 6/2007 | Barnicki et al. | |
| 2009/0019767 A1 | | 1/2009 | Abughazaleh et al. | |
| 2009/0126273 A1 | | 5/2009 | Barnicki | |

FOREIGN PATENT DOCUMENTS

WO WO 2008/103467 8/2008

OTHER PUBLICATIONS

U.S. Appl. No. 12/632,244, filed Dec. 7, 2009, Lechnick et al.

(Continued)

*Primary Examiner*—Robert J Hill, Jr.
*Assistant Examiner*—Christopher P Jones
(74) *Attorney, Agent, or Firm*—Mark Goldberg

(57) ABSTRACT

A process for maintaining a low carbon monoxide content in a carbon dioxide product that is made in a synthesis gas purification process is disclosed. More particularly, the invention involves an improved process in which a portion of a loaded solvent is sent through a carbon dioxide absorber instead of to a series of carbon dioxide flash drums.

12 Claims, 4 Drawing Sheets

OTHER PUBLICATIONS

Ma, L. et al., A novel carbon supported PtAuFe as CO-tolerant anode catalyst for proton exchange membrane fuel cells, Catalysis Communications 8(6) 2007, p. 921-925 Elsevier.

Choi, S. et al., Optimal design of synthesis gas production process with recycled carbon dioxide utilization, Industrial & Engin. Chemistry Research 47(2), 2008, p. 323-331.

Chiesa, P. et al., Shift reactors and physical absorption for low CO2 emission IGCCs, Intl Gas turbine Inst. & Aeroengine Congress, Stockholm 1998, Journal of Eng. V121, 1999.

Heintz, Y.J. et al., Novel physical solvents for selective CO2 capture from fuel gas streams at elevated pressures and temperature, Energy and Fuels 22(6), 2008, p. 3824-3837.

Abu-Zahra, M.R.M. et al, New process concepts for CO2 post-combustion capture process integ. with co-production of hydrogen, Intl Jour. of Hydrogen Energy, 34(9), 2009, p. 3992.

Michaels, H.J. et al., Hydrogen production via the k-t gasification process current economic & tech. aspects, 85th AICHE Natl Mtg. Phila. 1978. N53C 18P.

* cited by examiner

US 7,789,945 B2

MAINTAINING LOW CARBON MONOXIDE LEVELS IN PRODUCT CARBON DIOXIDE

BACKGROUND OF THE INVENTION

This invention generally relates to a process for a gas removal zone, such as an acid gas removal zone. More specifically, this invention relates to improvements in efficiency of such processes in which the level of carbon monoxide is reduced from the carbon dioxide that is being removed.

SUMMARY OF THE INVENTION

The invention provides a process for separation, recovery and utilization of gas streams comprising sulfur compounds, carbon dioxide and carbon monoxide from a synthesis gas (also referred to herein as "syngas") comprising an unshifted synthesis gas or a partially shifted synthesis gas produced from high pressure partial oxidation of a hydrocarbonaceous reactant while removing carbon monoxide from these gas streams and concentrating CO in a shifted synthesis gas stream. The process comprises first contacting the synthesis gas with a first liquid solvent in a first acidic gas removal unit to selectively absorb and remove at least a portion of carbon dioxide from the synthesis gas and to produce a purified synthesis gas; and then sending a portion of the first liquid solvent to a second acidic gas removal unit wherein at least a portion of carbon dioxide is contacted with the first liquid solvent mixed with a second liquid solvent to remove $CO_2$ from a shifted synthesis gas to produce a purified shifted synthesis gas and wherein at least a portion of CO from said first liquid solvent is transferred to said purified shifted synthesis gas.

In an embodiment of the invention, the loaded solvent from the carbon dioxide absorber for the unshifted or partially shifted syngas feed or syngas from a sulfur removal section is combined with the fully shifted syngas feed or syngas from the sulfur removal section prior to being sent to the carbon dioxide absorber for the fully shifted syngas.

DETAILED DESCRIPTION OF THE INVENTION

Figure 1:
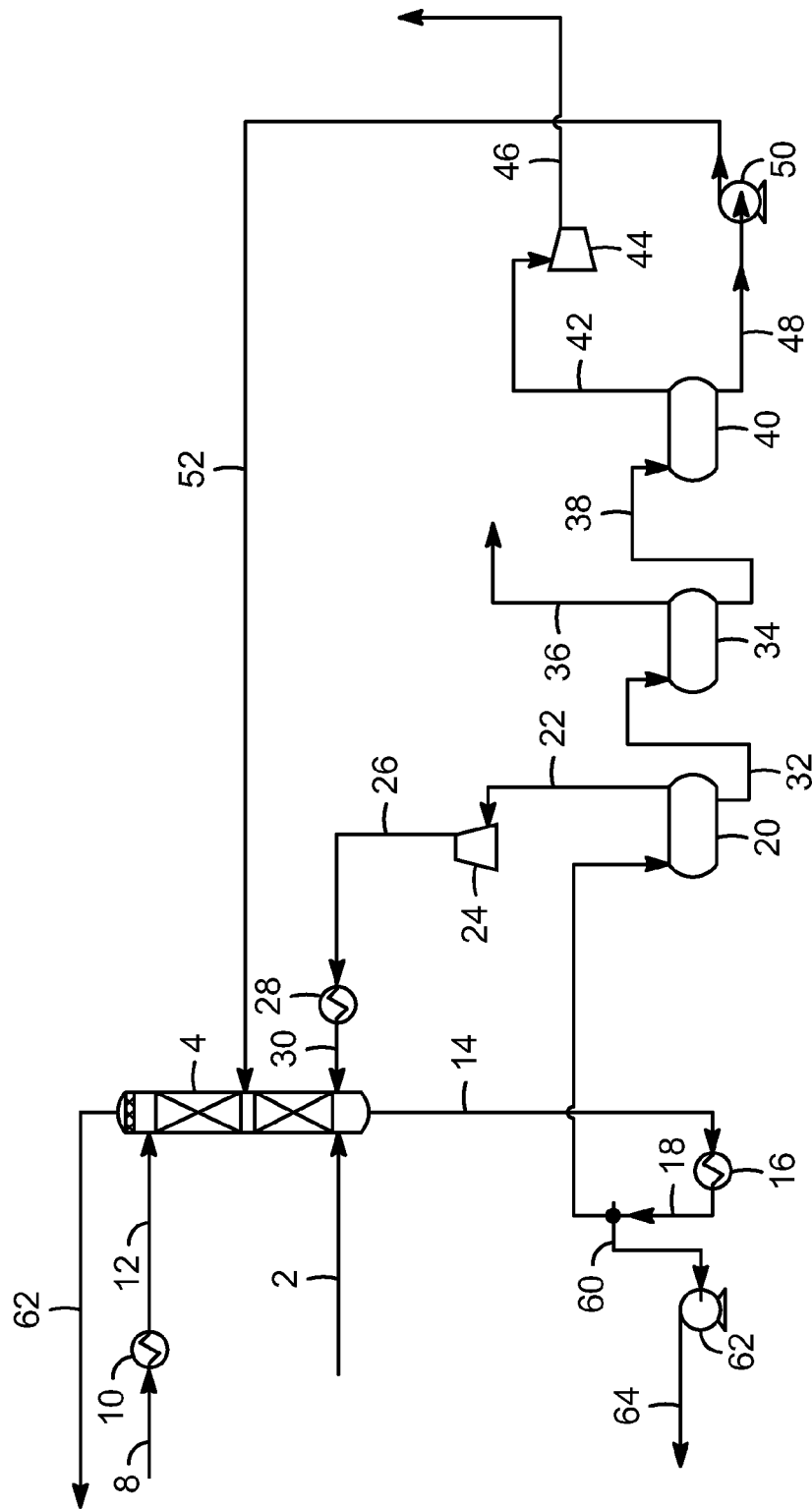
FIG. 1 shows the carbon dioxide removal section for an absorbent process for treating a single synthesis gas stream.

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Additionally, characterizing a stream as, e.g., a "partially-lean solvent stream" or a "lean solvent stream" can mean a stream including or rich in, respectively, at least one partially-lean solvent or lean solvent.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "vapor" can mean a gas or a dispersion that may include or consist of one or more hydrocarbons.

As used herein, the term "cooler" can mean a device cooling a fluid with water.

As used herein, the term "chiller" can mean a device cooling a fluid to a temperature below that obtainable by only using water. Typically, a chiller may use a refrigerant such as an ammonia, a hydrocarbon or a hydrofluorocarbon.

As used herein, the term "rich" can mean an amount of generally at least about 30%, or about 30%-about 70%, by mole, of a compound or class of compounds in a stream.

As used herein, the term "absorber" can include an adsorber, and relates, but is not limited to, absorption and/or adsorption.

As depicted, process flow lines in the drawings can be referred to as lines, effluents, streams, or portions. Particularly, a line can contain one or more effluents, streams or portions.

Figure 2:
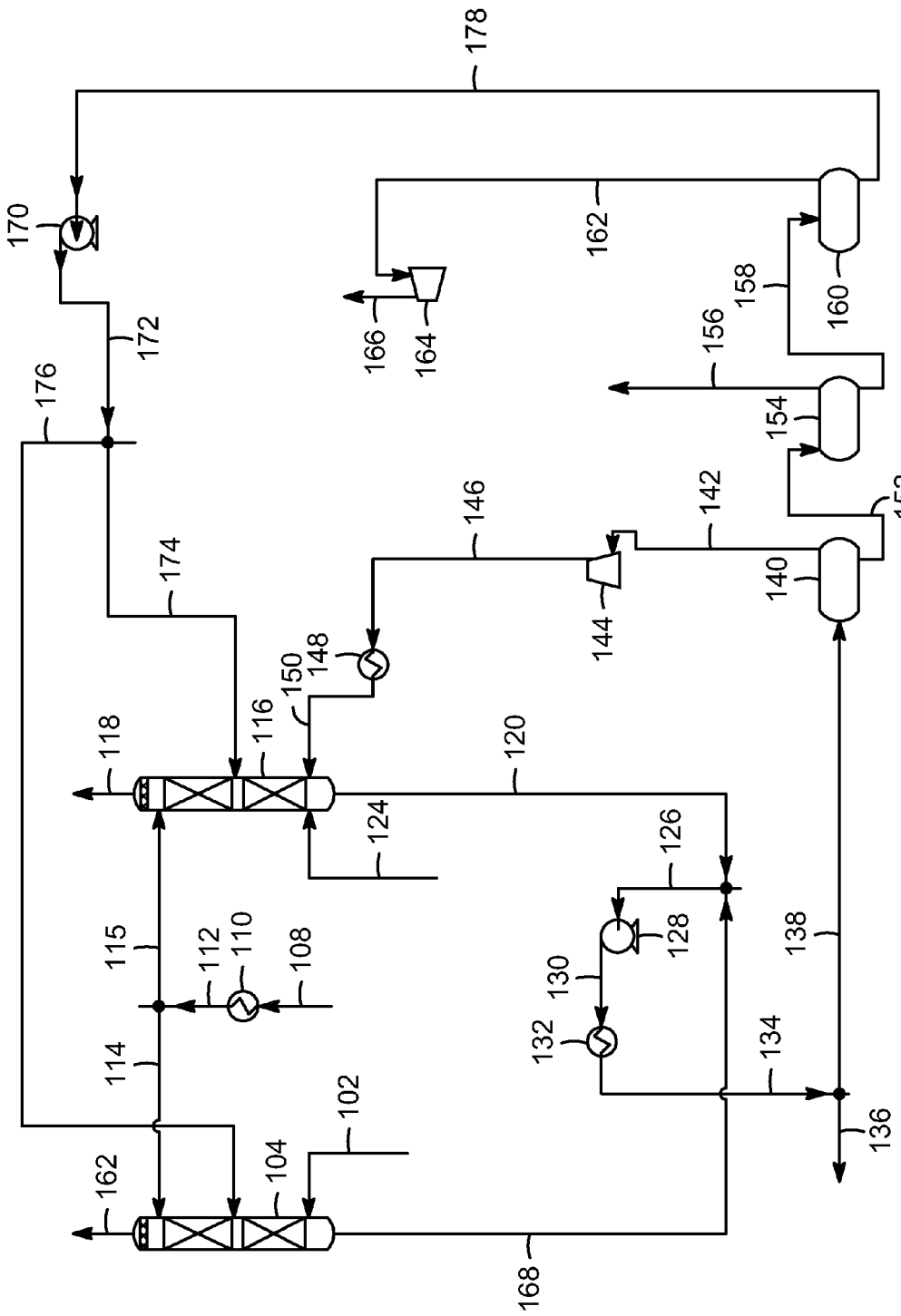
FIG. 2 shows the carbon dioxide removal sections of an absorbent process for processing both a fully shifted and an unshifted or partially shifted feed using separate absorbers for two feed gases but equipment in common for other parts of the process.

Often, a sour gas, such as a syngas, from a gasifier is treated with a solvent in at least one absorber to selectively remove one or more sulfur compounds, such as a hydrogen sulfide or a carbonyl sulfide, and carbon dioxide. It is sometimes desired to produce large quantities of hydrogen along with power from a gasification unit. In such instances a portion of the syngas from the gasifier is shifted to hydrogen in a reactor according to the reaction $CO+H_2O \rightarrow CO_2+H_2$. See for example U.S. Pat. No. 5,152,975 to Fong et al., incorporated herein by reference. The remainder of the syngas is cooled without shifting and, after further processing, sent to a combustion turbine. In addition, in gasification applications in which the final product is liquid fuels or chemicals, typically both a fully shifted and a partially shifted or unshifted feed must be treated in a process that removes the sulfur compounds ($H_2S$ and COS) and $CO_2$. There are several commercial processes for this application that are currently being marketed, including the Selexol® process—using a mixture of dimethyl ethers of polyethylene glycol (UOP LLC, Des Plaines, Ill.), the Rectisol® process—using a methanol solvent (licensed by both Linde AG, Polach, Germany and Lurgi AG, Frankfurt Am Main Germany), the Sulfinol® process—using a mixture of sulfolane and an aqueous solution of either di-isopropanol amine or methyl-diethanol amine (Jacobs, Pasadena, Calif.), the Flexsorb® process—using a proprietary solvent (ExxonMobil Research and Engineering, Fairfax, Va.), the Morphysorb® process—using a mixture of n-formylmorpholine and n-acetylmorpholine (Uhde GmbH, Dortmund, Germany) and the Purisol® process using N-Methyl-2-Pyrrolidone (NMP) (Lurgi AG, Frankfurt Am Main Germany). Each of these processes employs a solvent that absorbs the sulfur compounds and/or carbon dioxide from an acid gas. The most straightforward set-up for these types of processes is a separate train for both feeds similar to what is pictured in FIG. 1. From a capital cost stand-point, it is advantageous to have separate $H_2S$ and $CO_2$ absorbers for the two feeds and common equipment for the remainder of the process similar to what is pictured in FIG. 2. The set-up in FIG. 2 is typically able to meet the sulfur specifications for the treated gases and product $CO_2$ (using a medium pressure vent $CO_2$ and $CO_2$ from a vacuum compressor in FIGS. 1 and 2) without problems. However, the electricity requirements for the $CO_2$ recycle compressor become excessive as the CO spec in the product $CO_2$ is reduced below 1 mole %. The difficulty in keeping CO out of the product $CO_2$ is due to the high levels of CO in the partially shifted or unshifted feed and the relatively large absorption of CO in the $H_2S$ and $CO_2$ Absorbers for this feed. In current applications 1000 ppmv CO limits in the product $CO_2$ are becoming the normal specification. The large quantities of recycle gas from the $CO_2$ recycle compressor ultimately increase the semi-lean and lean solvent requirements and associated utilities such as refrigeration and reboiler duty to undesirable levels as well.

Figure 3:
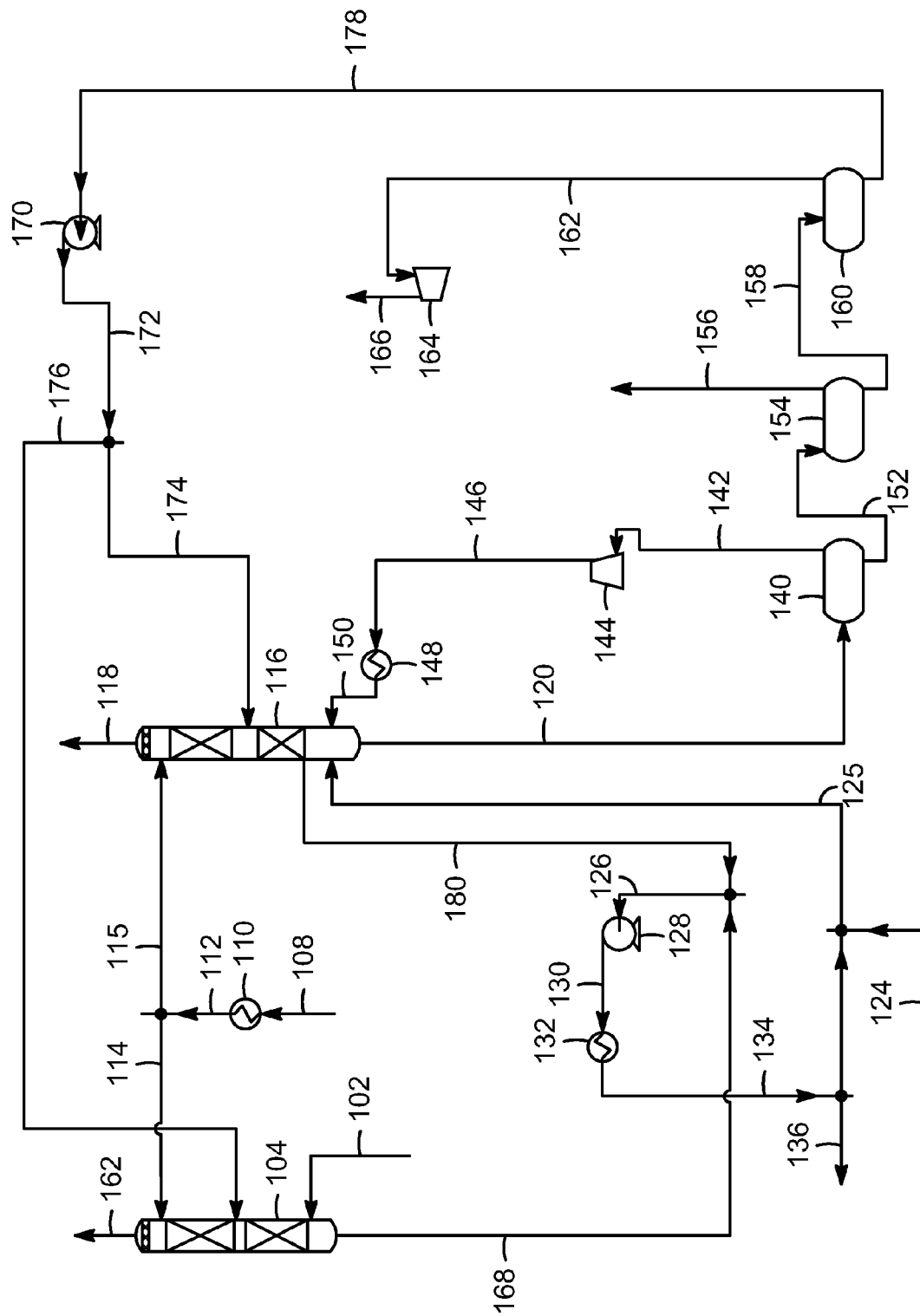
FIG. 3 shows carbon dioxide removal sections for an absorbent process for processing both shifted and unshifted or partially shifted feeds that minimize the carbon monoxide in a product carbon dioxide stream.

The CO levels in the product $CO_2$ are kept at manageable levels by transferring the CO that is absorbed in the $H_2S$ and $CO_2$ absorbers for the partially shifted or unshifted syngas to the treated fully shifted syngas. This transfer is acceptable as long as the additional CO in the treated fully shifted syngas does not adversely affect its properties, which is the case for most applications. The absorbed CO is transferred to the fully shifted syngas by combining the solvent from the bottom of the $CO_2$ Absorber for the partially shifted or unshifted syngas with sidedraw solvent from the $CO_2$ absorber for the fully shifted syngas and returning the combined solvent to the $CO_2$ absorber for the fully shifted syngas (FIG. 3). Prior to returning the solvent to the $CO_2$ absorber for the fully shifted syngas it is chilled and contacted with overhead vapor from the $H_2S$ absorber for the fully shifted syngas to increase the $CO_2$ loading. The increased $CO_2$ loading combined with the relatively low level of CO in the fully shifted syngas provides a driving force that causes desorption of much of the CO in the $CO_2$ absorber into the fully shifted syngas. This desorption effectively removes the CO that is absorbed from the partially shifted or unshifted syngas from the solvent and prevents it from entering the product $CO_2$. One design based on the FIG. 3 configuration had electricity requirements of slightly less than 12 mW. Designs based on separating the 2 feeds into separate trains (as in FIG. 1), having separate absorbers for the 2 feeds without the transfer of CO into the fully shifted gas (as in FIG. 2), or a variation of the separate absorbers case in which the partially shifted or unshifted syngas has its own recycle flash and compressor, require a minimum of 10 mW more electricity to operate even when the 1000 ppmv CO spec in the product $CO_2$ is met.

Figure 4:
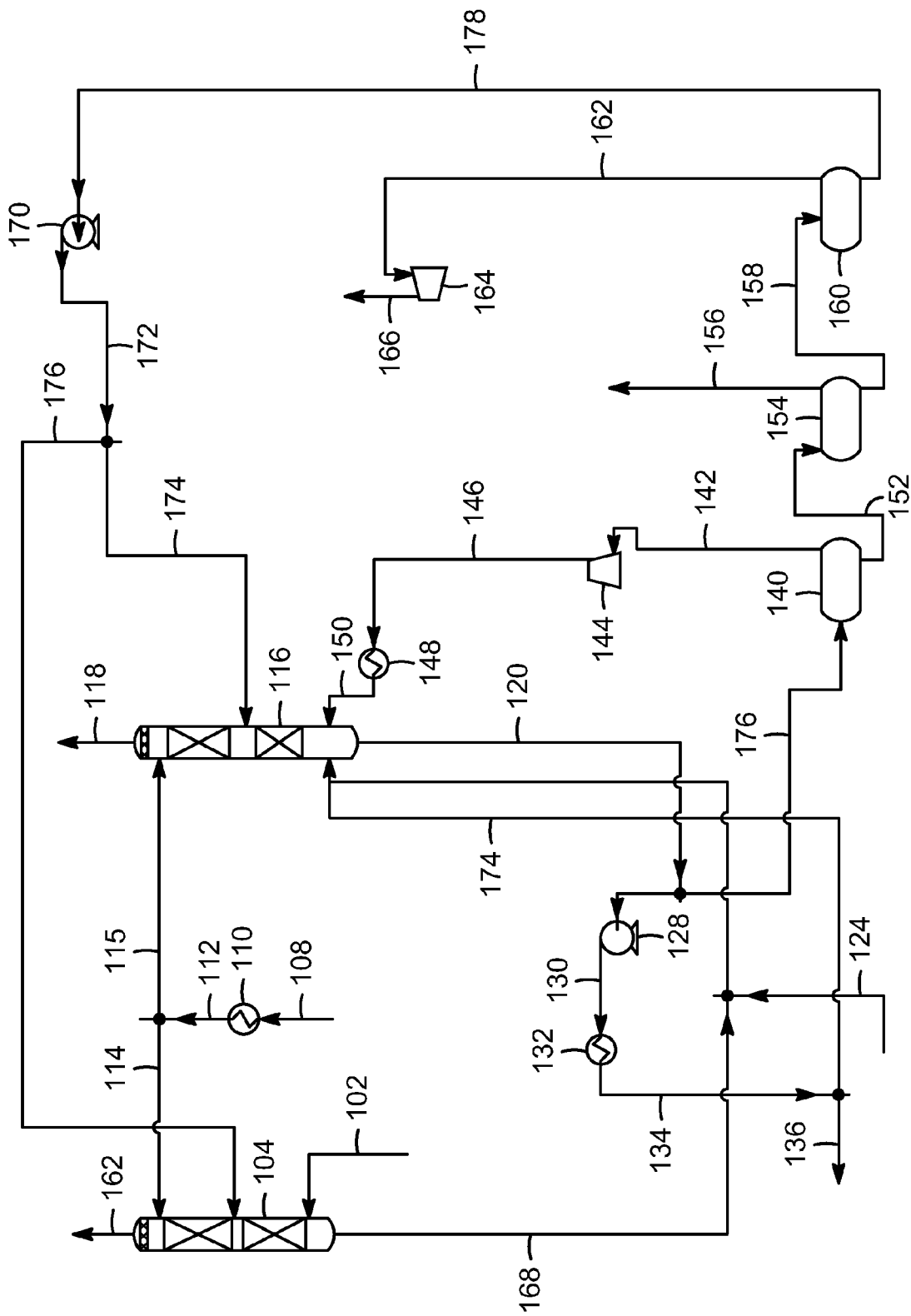
FIG. 4 shows a modification of the carbon dioxide removal sections shown in FIG. 3.

The invention is best implemented via the configuration presented in FIGS. 3 and 4. Since the invention requires modifications in only the $CO_2$ removal section, it is possible to implement via the $CO_2$ removal section configurations appearing in FIGS. 3 and 4 combined with an $H_2S$ removal section that is configured at the discretion of the engineer.

In order to understand the present invention, it is useful to first consider a simplified explanation of a system to treat a single synthesis gas stream. FIG. 1 shows a carbon dioxide removal section for an absorbent process for treating a single synthesis gas stream. A solvent or mixture of solvents is used in the process. Among the solvents that can be used are a dimethyl ether of polyethylene glycol, a N-methyl pyrrolidone, a tetrahydro-1,4-oxazine, a methanol, and a mixture comprising diisopropanolamine, tetrahydrothiophene-1,1-dioxide and mixtures thereof FIG. 1 shows a feed stream 2 of syngas which may be a feed syngas or a syngas feed from a sulfur removal section that is not shown in the figure. The stream 2 is shown entering a lower portion of a carbon dioxide absorber 4 in which the syngas travels in an upward direction while contacting the solvent to remove carbon dioxide and producing a treated syngas 62 that is shown exiting a top portion of carbon dioxide absorber 4. A lean stream 8 of solvent is shown being cooled by chiller 10 and then continuing as stream 12 to enter an upper portion of carbon dioxide absorber 4. Lean stream 8 of solvent is either a fresh stream that has not been employed in the carbon dioxide removal section of the present invention or the lean stream has been regenerated through removal of impurities including carbon dioxide and sulfur compounds. The loaded solvent 14 is shown exiting the bottom of carbon dioxide absorber 4 and pass through a loaded solvent chiller 16 to continue as cooled loaded solvent stream 18 that is either sent to a carbon dioxide removal section that has a series of flash drums and compressors or it may be pumped to a sulfur removal section (not shown) or otherwise disposed of. The portion of the cooled loaded solvent stream 18 that is sent to the carbon dioxide removal section first is shown going to a carbon dioxide recycle flash drum 20 in which a portion of the solvent stream 22 is flashed to a carbon dioxide recycle compressor 24 to compressed stream 26 carbon dioxide recycle cooler 28 to return the compressed stream to about the temperature of stream 2 and finally to return to a bottom portion of carbon dioxide absorber 4. A solvent stream 32 is sent from carbon dioxide recycle flash drum 20 to carbon dioxide vent flash drum 34 from which vents purified carbon dioxide stream 36. The solvent stream then continues in line 38 to carbon dioxide vacuum flash drum 40 with carbon dioxide leaving at line 42 to vacuum compressor 44 and to purified carbon dioxide stream 46. A stream of semi-lean solvent that now has a reduced concentration of carbon dioxide is shown in line 48 to be pumped by semi-lean solvent pump 50 to return to a middle portion of carbon dioxide absorber 4 through line 52. The portion of the loaded solvent that exits the carbon dioxide removal section shown in this drawing, is sent through line 60 to pump 62 where it is pumped as exiting the system shown at 64.

FIG. 2 is also shown to provide a comparison between the prior art process of FIG. 2 with the process of the invention shown in FIGS. 3 and 4. FIG. 2 shows the carbon dioxide removal section for an absorbent process for processing both fully shifted and unshifted or partially shifted feeds using separate absorbers for two feed gases but common equipment for other aspects of the process. More specifically, there are shown a first feed 102 and a second feed 124 that are being sent to a first carbon dioxide absorber 104 and a second carbon dioxide absorber 116, respectively. The first feed 102 may be an unshifted or a partially shifted syngas feed or a syngas feed from a sulfur removal section of the process. The second feed 124 may be a fully shifted syngas feed or may be a syngas feed from a sulfur removal section of the process. First feed 102 contacts a solvent as explained in FIG. 1 above in which carbon dioxide is removed from first feed 102 to be dissolved or otherwise contained within the solvent until the solvent is regenerated. A treated unshifted or partially shifted syngas 162 exits the top of carbon dioxide absorber 104. Second feed 124 contacts a solvent in carbon dioxide absorber 116 and a treated fully shifted syngas exits at 118. A lean solvent 108 is cooled by lean solvent chiller 110 and passes through line 112 to lines 114 and 115 to enter a top portion of carbon dioxide absorbers 104 and 116, respectively. Regarding carbon dioxide absorber 104, a loaded solvent stream 168 exits a bottom portion of carbon dioxide absorber 104 and then passes through line 126 to loaded solvent pump 128, to line 130 to loaded solvent chiller 132 and line 134. The loaded solvent stream in line 134 is then either sent in line 136 to be regenerated or to the sulfur removal sections of the process to be used in sulfur removal absorbers. Similar to loaded solvent stream 168 that exits carbon dioxide absorber 104 is shown a second loaded solvent stream 120 that exits carbon dioxide absorber 116. Loaded solvent stream 168 and second loaded solvent stream 120 are combined in line 126. Also shown in the figure is a portion of the solvent being sent through a series of flash drums to remove a carbon dioxide product. More specifically, a portion of the loaded solvent stream continues through line 138 to carbon dioxide recycle flash drum 140 with an overhead vapor passing through line 142 to carbon dioxide recycle compressor 144 to line 146 to carbon dioxide recycle cooler 148 to line 150 and then to return to bottom portion of carbon dioxide absorber 116. The solvent having a higher proportion of carbon dioxide relative to the overhead vapor in line 142 is sent through line 152 to carbon dioxide medium pressure vent flash drum 154 with a medium pressure flow of carbon dioxide exiting through line 156 and the solvent stream continuing to line 158 to carbon dioxide vacuum flash drum 160. The carbon dioxide exits through line 162 to vacuum compressor 164 and then exits the process in line 166. The solvent which now is considered to be semi-lean is returned to the carbon dioxide absorbers through line 178 to semi-lean solvent pump 170 to line 172. One portion of the semi-lean solvent in line 172 is returned to the first carbon dioxide absorber through line 176 and a second portion of the semi-lean solvent is returned to the second carbon dioxide absorber through line 174.

FIG. 3 generally shows carbon dioxide removal sections of an absorbent process for purifying a gas stream that contains two different feeds such as a shifted and an unshifted or partially shifted feed that minimizes the carbon monoxide content in a carbon dioxide stream that is removed from the feeds. More specifically, there are shown a first feed 102 and a second feed 124 that are being sent to a first carbon dioxide absorber 104 and a second carbon dioxide absorber 116, respectively. The second feed 124 is shown first passing through line 125 prior to entering second carbon dioxide absorber 116. The first feed 102 may be an unshifted or a partially shifted syngas feed or a syngas feed from a sulfur removal section of the process. The second feed 124 may be a fully shifted syngas feed or a syngas feed from a sulfur removal section of the process. In this embodiment of the invention, a portion of a loaded solvent in line 134 from first carbon dioxide absorber 104 is combined with the second feed 124.

First feed 102 contacts a solvent as explained in FIG. 1 above in which carbon dioxide is removed from first feed 102 and then a treated unshifted or partially shifted syngas 162 exits the top of carbon dioxide absorber 104. Second feed 124 contacts a solvent which removes carbon dioxide in carbon dioxide absorber 116 and a treated fully shifted syngas exits at 118. The solvent that is used in the two carbon dioxide absorbers are shown as a lean solvent 108 that is cooled by lean solvent chiller 110 and then passes through line 112 to lines 114 and 115 to enter a top portion of carbon dioxide absorbers 104 and 116 respectively. Regarding carbon dioxide absorber 104, a loaded solvent stream 168 exits a bottom portion of carbon dioxide absorber 104 and then passes through line 126 to loaded solvent pump 128, then to line 130 to loaded solvent chiller 132 and then line 134. The loaded solvent stream is then either sent in line 136 to be regenerated or to the sulfur removal sections of the process to be used in sulfur removal absorbers or a portion from line 134 is combined with second feed 124 in line 125. Similar to loaded solvent stream 168 that exits carbon dioxide absorber 104 is shown a loaded solvent stream 180 that exits carbon dioxide absorber 116. Loaded solvent stream 168 and loaded solvent stream 180 are combined in line 126. Also shown in the figure is the solvent being sent through a series of flash drums to remove a carbon dioxide product. More specifically a loaded solvent stream 120 exits a bottom portion of carbon dioxide absorber 116 to carbon dioxide recycle flash drum 140 with an overhead vapor passing through line 142 to carbon dioxide recycle compressor 144 to line 146 to carbon dioxide recycle cooler 148 to line 150 and then to return to a bottom portion of carbon dioxide absorber 116. The solvent having a higher proportion of carbon dioxide relative to the overhead vapor in line 142 is sent through line 152 to carbon dioxide medium pressure vent flash drum 154 with a medium pressure flow of carbon dioxide exiting through line 156 and the solvent stream continuing to line 158 to carbon dioxide vacuum flash drum 160. The carbon dioxide stream which contains less than 10% carbon monoxide exits through line 162 to vacuum compressor 164 and then exits the process in line 166. The solvent which now is considered to be semi-lean is returned to the carbon dioxide absorbers through line 178 to semi-lean solvent pump 170 to line 172. One portion of the semi-lean solvent is returned to the first carbon dioxide absorber through line 176 and a second portion of the semi-lean solvent is returned to the second carbon dioxide absorber through line 174.

FIG. 4 generally shows carbon dioxide removal sections of an absorbent process for purifying a gas stream that contains two different feeds such as a shifted and an unshifted or partially shifted feed that minimizes the carbon monoxide content in a carbon dioxide stream that is removed from the feeds. Unlike the embodiment shown in FIG. 3, a portion of the loaded solvent from the carbon dioxide absorber for fully shifted syngas is sent to regeneration or to the sulfur removal sections of the process instead of being first sent to the carbon dioxide removal section of the process. More specifically, there are shown a first feed 102 and a second feed 124 that are being sent to a first carbon dioxide absorber 104 and a second carbon dioxide absorber 116, respectively. The second feed 124 combined with loaded solvent 168 from first carbon dioxide absorber 102 before entering second carbon dioxide absorber 116. The first feed 102 may be an unshifted or a partially shifted syngas feed or a syngas feed from a sulfur removal section of the process. The second feed 124 may be a fully shifted syngas feed or may be a syngas feed from a sulfur removal section of the process. In this embodiment of the invention, a portion of a loaded solvent 174 from the second carbon dioxide absorber 116 is combined with the loaded solvent 168 and the second feed 124.

First feed 102 contacts a solvent as explained in FIG. 1 above in which carbon dioxide is removed from first feed 102 with a treated unshifted or partially shifted syngas 162 exiting the top of carbon dioxide absorber 104. Second feed 124 after combining with chilled loaded solvent 134 and loaded solvent 168 contacts a solvent in carbon dioxide absorber 116 and a treated fully shifted syngas exits at 118. A lean solvent 108 is cooled by lean solvent chiller 110 and passes through line 112 to lines 114 and 115 to enter a top portion of carbon dioxide absorbers 104 and 116 respectively. Regarding carbon dioxide absorber 104, a loaded solvent stream 168 exits a bottom portion of carbon dioxide absorber 104 combines with second feed 124 and then is combined with solvent stream 174 to enter a lower portion of second carbon dioxide absorber 116. The loaded solvent stream 120 is then either sent to be regenerated or it is sent to a carbon dioxide recovery section of the process. Similar to loaded solvent stream 168 that exits carbon dioxide absorber 104 is shown a second loaded solvent stream 120 that exits carbon dioxide absorber 116. Loaded solvent stream 168 and second loaded solvent stream 120 are combined. Also shown in the figure is the solvent being sent through a series of flash drums to remove a carbon dioxide product. More specifically the loaded solvent stream 120 exits a bottom portion of carbon dioxide absorber 116 to line 176 to carbon dioxide recycle flash drum 140 with an overhead vapor passing through line 142 to carbon dioxide recycle compressor 144 to line 146 to carbon dioxide recycle cooler 148 to line 150 and then to return to bottom portion of carbon dioxide absorber 116. The solvent having a higher proportion of carbon dioxide relative to the overhead vapor in line 142 is sent through line 152 to carbon dioxide medium pressure vent flash drum 154 with a medium pressure flow of carbon dioxide exiting through line 156 and the solvent stream continuing to line 158 to carbon dioxide vacuum flash drum 160. The carbon dioxide exits through line 162 to vacuum compressor 164 and then exits the process in line 166. The solvent which now is considered to be semi-lean is returned to the carbon dioxide absorbers through line 178 to semi-lean solvent pump 170 to line 172. One portion of the semi-lean solvent is returned to the first carbon dioxide absorber through line 176 and a second portion of the semi-lean solvent is returned to the second carbon dioxide absorber through line 174.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for separation, recovery and utilization of gas streams comprising sulfur compounds, carbon dioxide and carbon monoxide from a synthesis gas comprising an unshifted synthesis gas or a partially shifted synthesis gas produced from high pressure partial oxidation of a hydrocarbonaceous reactant while removing carbon monoxide from said gas streams and concentrating said CO in a shifted synthesis gas stream, said process comprising:
   a) contacting the synthesis gas with a first liquid solvent in a first carbon dioxide absorber to selectively absorb and remove at least a portion of carbon dioxide from the synthesis gas and to produce a purified synthesis gas;
   b) sending a portion of said first liquid solvent to a second carbon dioxide absorber wherein a fully shifted synthesis gas is contacted with said first liquid solvent mixed with a second liquid solvent before entering said second carbon dioxide absorber to remove $CO_2$ from said shifted synthesis gas to produce a purified shifted synthesis gas and wherein at least a portion of CO from said first liquid solvent is transferred to said purified shifted synthesis gas; and
   c) removing carbon dioxide from a loaded solvent stream to produce a carbon dioxide product stream.

2. The process of claim 1 wherein said synthesis gas is sent to a sulfur absorber to contact a liquid solvent to remove said sulfur compounds and produce a synthesis gas with a reduced concentration of sulfur compounds.

3. The process of claim 1 wherein said shifted synthesis gas is sent to a sulfur absorber unit to contact a liquid solvent to remove said sulfur compounds and produce a shifted synthesis gas with a reduced concentration of sulfur compounds.

4. The process of claim 1 wherein said liquid streams comprise at least one of a dimethyl ether of polyethylene glycol, a N-methylpyrrolidone, a tetrahydro-1,4-oxazine, a methanol, and a mixture comprising diisopropanolamine and tetrahydrothiophene-1,1-dioxide.

5. The process of claim 1 wherein a loaded solvent stream from said second carbon dioxide absorber is combined with a second feed to form a third stream that is then returned to said second carbon dioxide absorber.

6. The process of claim 5 wherein a loaded solvent stream from said first carbon dioxide absorber is combined with said third stream.

7. The process of claim 1 wherein said carbon dioxide product stream contains less than about 1000 ppm carbon monoxide in addition to carbon dioxide in said carbon dioxide product stream.

8. The process of claim 1 wherein a portion of a loaded solvent is removed from said second absorber to be chilled and a second portion of a loaded solvent is removed from said second absorber to be treated in a carbon dioxide removal zone.

9. The process of claim 1 wherein said first liquid solvent is from a bottom of said first carbon dioxide absorber.

10. The process of claim 1 wherein said first liquid solvent is loaded before entering said second carbon dioxide absorber.

11. A process for separation, recovery and utilization of gas streams comprising sulfur compounds, carbon dioxide and carbon monoxide from a synthesis gas comprising an unshifted synthesis gas or a partially shifted synthesis gas produced from high pressure partial oxidation of a hydrocarbonaceous reactant while removing carbon monoxide from said gas streams and concentrating said CO in a shifted synthesis gas stream, said process comprising:
   a) contacting the synthesis gas with a first liquid solvent in a first carbon dioxide absorber to selectively absorb and remove at least a portion of carbon dioxide from the synthesis gas and to produce a purified synthesis gas;
   b) sending a portion of said first liquid solvent from a bottom of said first carbon dioxide absorber to a second carbon dioxide absorber wherein a fully shifted synthesis gas is contacted with said portion of said first liquid solvent mixed with a second liquid solvent before entering the second carbon dioxide absorber to remove $CO_2$ from said shifted synthesis gas to produce a purified shifted synthesis gas and wherein at least a portion of CO from said portion of said first liquid solvent is transferred to said purified shifted synthesis gas; and
   c) removing carbon dioxide from a loaded solvent stream to produce a carbon dioxide product stream.

12. The process of claim 11 wherein said liquid streams comprise at least one of a dimethyl ether of polyethylene glycol, a N-methylpyrrolidone, a tetrahydro-1,4-oxazine, a methanol, and a mixture comprising diisopropanolamine and tetrahydrothiophene-1,1-dioxide.

* * * * *